US010028059B2

(12) United States Patent
Backman (10) Patent No.: US 10,028,059 B2
(45) Date of Patent: Jul. 17, 2018

(54) HEADPHONE AND ASSOCIATED HOST APPARATUS SUPPORTING BOTH DIGITAL AND ANALOG AUDIO CONNECTIVITY

(71) Applicant: Microsoft Technology Licensing, LLC, Redmond, WA (US)

(72) Inventor: Juha Backman, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 14/873,375

(22) Filed: Oct. 2, 2015

(65) Prior Publication Data

US 2017/0064456 A1 Mar. 2, 2017

Related U.S. Application Data

(60) Provisional application No. 62/208,904, filed on Aug. 24, 2015.

(51) Int. Cl.
*H04R 5/04* (2006.01)
*G06F 3/16* (2006.01)
(Continued)

(52) U.S. Cl.
CPC ............ *H04R 5/04* (2013.01); *G06F 3/162* (2013.01); *H04R 29/001* (2013.01);
(Continued)

(58) Field of Classification Search
CPC ...... H04R 5/04; H04R 29/001; H04R 1/1041; H04R 2420/05; G06F 3/162; H04S 3/006; H04S 3/004; H04S 3/008
(Continued)

(56) References Cited

U.S. PATENT DOCUMENTS 7,031,454 B1 4/2006 Stelman
7,869,616 B2 1/2011 Harvey et al.
(Continued)

FOREIGN PATENT DOCUMENTS

CN 102065352 A 5/2011
CN 103945310 A 7/2014
(Continued)

OTHER PUBLICATIONS

"International Search Report and Written Opinion Issued in PCT Application No. PCT/US2016/043799", dated Nov. 16, 2016, 11 Pages.
(Continued)

*Primary Examiner* — Oyesola C Ojo (57) ABSTRACT

In one example, a headphone apparatus comprises an audio signal input interface configured to receive an input audio signal from a connected host apparatus; at least one headphone audio amplifier configured to be disabled in response to the input audio signal being analog, and further configured to amplify the input audio signal in response to the input audio signal being digital; and at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

20 Claims, 8 Drawing Sheets

(51) Int. Cl.
*H04R 29/00* (2006.01)
*H04R 1/10* (2006.01)

(52) U.S. Cl.
CPC .......... *H04R 1/1041* (2013.01); *H04R 1/1083* (2013.01); *H04R 2420/05* (2013.01)

(58) Field of Classification Search
USPC .......................................................... 381/74
See application file for complete search history.

(56) References Cited

U.S. PATENT DOCUMENTS

| | | | |
|---|---|---|---|
| 7,899,946 B2 | 3/2011 | Sherman et al. | |
| 8,363,856 B2 | 1/2013 | Lesso et al. | |
| 8,705,771 B1 | 4/2014 | Chen et al. | |
| 8,781,147 B1 | 7/2014 | Giuroiu | |
| 9,054,656 B2 | 6/2015 | Seven | |
| 9,658,818 B2* | 5/2017 | Pelland | G06F 3/162 |
| 9,733,086 B2* | 8/2017 | Forutanpour | G01C 21/00 |
| 9,877,099 B2* | 1/2018 | Donaldson | H04R 1/1041 |
| 2005/0105717 A1 | 5/2005 | Lawrie | |
| 2007/0223719 A1* | 9/2007 | Huang | H04R 1/1041 |
| | | | 381/74 |
| 2009/0220105 A1 | 9/2009 | Bachmann | |
| 2010/0128900 A1* | 5/2010 | Johnson | H03G 3/001 |
| | | | 381/98 |
| 2010/0194561 A1 | 8/2010 | Motoyama et al. | |
| 2010/0260341 A1* | 10/2010 | Sander | H04R 1/1041 |
| | | | 381/1 |
| 2014/0003616 A1 | 1/2014 | Johnson et al. | |
| 2014/0029770 A1 | 1/2014 | Chien et al. | |
| 2015/0002228 A1 | 1/2015 | Huang et al. | |
| 2016/0157008 A1* | 6/2016 | Zhang | H04R 5/04 |
| | | | 381/74 |
| 2017/0134851 A1* | 5/2017 | Theiler | G06F 1/266 |

FOREIGN PATENT DOCUMENTS

| | | | | |
|---|---|---|---|---|
| EP | 3007464 A1 * | 4/2016 | | H04R 5/04 |
| WO | 2013143971 A2 | 10/2013 | | |
| WO | WO 2013143971 A2 * | 10/2013 | | H04R 1/1083 |

OTHER PUBLICATIONS

"NAD D 3020 Hybrid Digital Amplifier", Published on: Aug. 17, 2013, Available at http://nadeeletronics.com/products/digital-music/D-3020-Hybrid-Digital-Amplifier.

"High Efficiency, Ground-Referenced Class-G Headphone Amplifier", Retreived on: Aug. 18, 2015, Available at: http://www.farnell.com/datasheets/1563194.pdf.

* cited by examiner

HEADPHONE AND ASSOCIATED HOST APPARATUS SUPPORTING BOTH DIGITAL AND ANALOG AUDIO CONNECTIVITY

CROSS-REFERENCE TO RELATED APPLICATION

This non-provisional utility application claims priority to U.S. provisional application Ser. No. 62/208,904 entitled "HEADPHONE AND ASSOCIATED HOST APPARATUS SUPPORTING BOTH DIGITAL AND ANALOG AUDIO CONNECTIVITY" and filed on Aug. 24, 2015, which is incorporated herein in its entirety by reference.

BACKGROUND

Headphones are commonly used with host or audio source apparatuses, such as various mobile communication apparatuses including cellular phones, smartphones and tablet computers. As a result, there may be instances when a host apparatus supports only digital audio connectivity and the headphone supports only analog connectivity, or vice versa.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, a headphone apparatus comprises an audio signal input interface configured to receive an input audio signal from a connected host apparatus; at least one headphone audio amplifier configured to be disabled in response to the input audio signal being analog, and further configured to amplify the input audio signal in response to the input audio signal being digital; and at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

In another example, a host apparatus and a system have been discussed along with the features of the multi-band multi-feed antenna.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
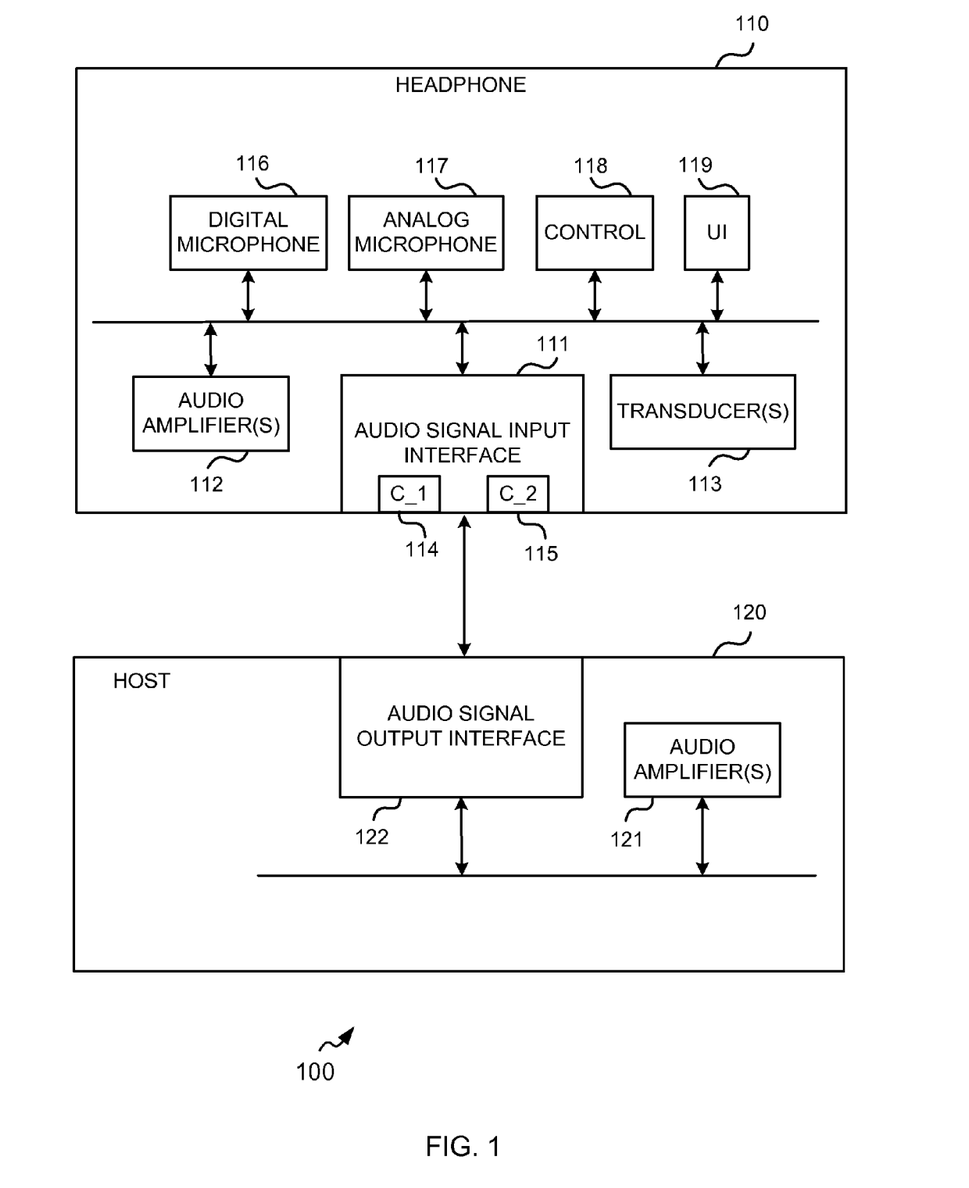
FIG. 1 illustrates an example of a headphone apparatus and a host apparatus capable of implementing example embodiments described herein.

FIG. 1 illustrates a system 100 comprising a headphone apparatus 110 and a host apparatus 120 in accordance with an example embodiment. The host apparatus 120 may be employed, for example, in the apparatus 800 of FIG. 8. However, it should be noted that the host apparatus 120 may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

The host apparatus 120 comprises at least one host audio amplifier 121 that is configured to be disabled in response to a connected headphone apparatus 110 supporting digital audio communication. The at least one host audio amplifier 121 may be configured to be disabled by being switched to a high output impedance state. The at least one host audio amplifier 121 is further configured to amplify an output audio signal in response to the connected headphone apparatus 110 not supporting digital audio communication.

The host apparatus 120 further comprises an audio signal output interface 122 that is configured to output a non-amplified output audio signal in digital form in response to the connected headphone apparatus 110 supporting digital audio communication, and to output the amplified output audio signal in analog form in response to the connected headphone apparatus 110 not supporting digital audio communication. The audio signal output interface 122 may comprise e.g. a 3.5 mm socket. The audio signal output interface 122 may conform to a mobile industry processor interface (MIPI), such as MIPI SoundWire.

The host apparatus 120 may be configured to detect whether the connected headphone apparatus 110 supports digital audio communication. The host apparatus 120 may be configured to perform the detection of whether the connected headphone apparatus 110 supports digital audio communication by detecting connector order of an audio signal input interface 111 of the connected headphone apparatus 110.

The headphone apparatus 110 comprises an audio signal input interface 111 that is configured to receive an input audio signal from the connected host apparatus 120. The audio signal input interface 111 may comprise at least one primary connector 114 that is configured to receive a digital input audio signal from the connected host apparatus 120. The audio signal input interface 111 may further comprise at least one secondary connector 115 that is configured to receive an analog input audio signal from the connected host apparatus 120. The at least one primary connector 114 may be further configured to provide the received digital input audio signal to the at least one headphone audio amplifier 112. The at least one secondary connector 115 may be further configured to provide the received analog input audio signal to the at least one headphone transducer 113. The audio signal input interface 111 may comprise e.g. a 3.5 mm plug. The audio signal input interface 111 may conform to a mobile industry processor interface (MIPI), such as MIPI SoundWire.

The headphone apparatus 110 further comprises at least one headphone audio amplifier 112 that is configured to be disabled in response to the input audio signal being analog. The at least one headphone audio amplifier 112 may be configured to be disabled by being switched to a high output impedance state.

The headphone audio amplifier 112 is further configured to amplify the input audio signal in response to the input audio signal being digital. The headphone apparatus 110 further comprises at least one headphone transducer 113 that is configured to obtain the input audio signal from the audio signal input interface 111 in response to the input audio signal being analog. The at least one headphone transducer 113 is further configured to obtain the amplified input audio signal from the at least one headphone audio amplifier 112 in response to the input audio signal being digital. The at least one headphone transducer 113 is further configured to output the obtained audio signal.

The headphone apparatus 110 may further comprise a digital microphone 116 that is configured to provide a digital microphone signal. Alternatively or in addition, the headphone apparatus 110 may further comprise an analog microphone 117 that is configured to provide an analog microphone signal.

The headphone apparatus 110 may further comprise a control unit 118 that is configured to control at least one of the headphone apparatus 110 and the connected host apparatus 120 in accordance with received control data. Such control may be related to e.g. audio playback. The control data may be received from a user interface 119 comprised in at least one of the headphone apparatus 110 and the connected host apparatus 120.

The headphone apparatus 110 may be further configured to apply auxiliary signal processing to a digital input audio signal. The auxiliary signal processing may comprise e.g. active noise cancellation, utilization of sensor data from at least one sensor comprised in the headphone apparatus 110, and/or equalization specific to the headphone apparatus 110.

Figure 2:
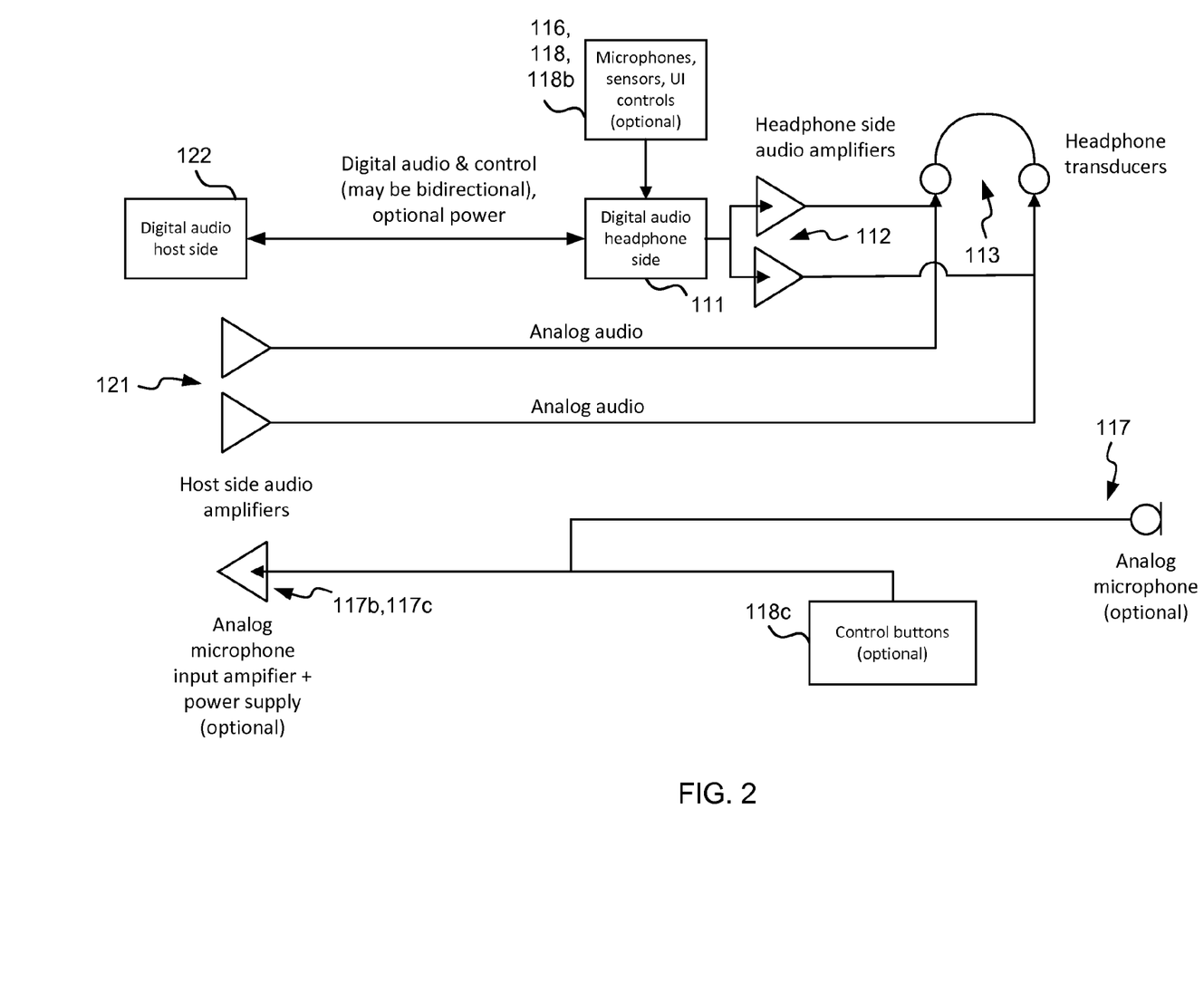
FIG. 2 is an example circuit diagram of a headphone apparatus and a host apparatus in accordance with an example embodiment.

FIG. 2 is an example circuit diagram of a headphone apparatus 110 and a host apparatus 120 in accordance with an example embodiment. The host apparatus 120 may be employed, for example, in the apparatus 800 of FIG. 8. However, it should be noted that the host apparatus 120 may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 2, the functionalities of the audio signal input interface 111, the headphone audio amplifiers 112, the headphone transducers 113, the digital microphone 116, the analog microphone 117, the control unit 118, the host audio amplifiers 121, and the audio signal output interface 122 are substantially similar to those of their counterparts in the example of FIG. 1, so their descriptions are not repeated here in detail. The example of FIG. 2 further comprises an analog microphone input amplifier 117b, a power supply 117c, sensors 118b, and control buttons 118c.

In the example of FIG. 2, data and analog connectivity physical lines are shown separately for clarity. Digital communication and analog input may share the same connector pins and cable conductors, but are not in use simultaneously. In other words, the same physical conductor is used alternatively for analog and digital audio.

Figure 3:
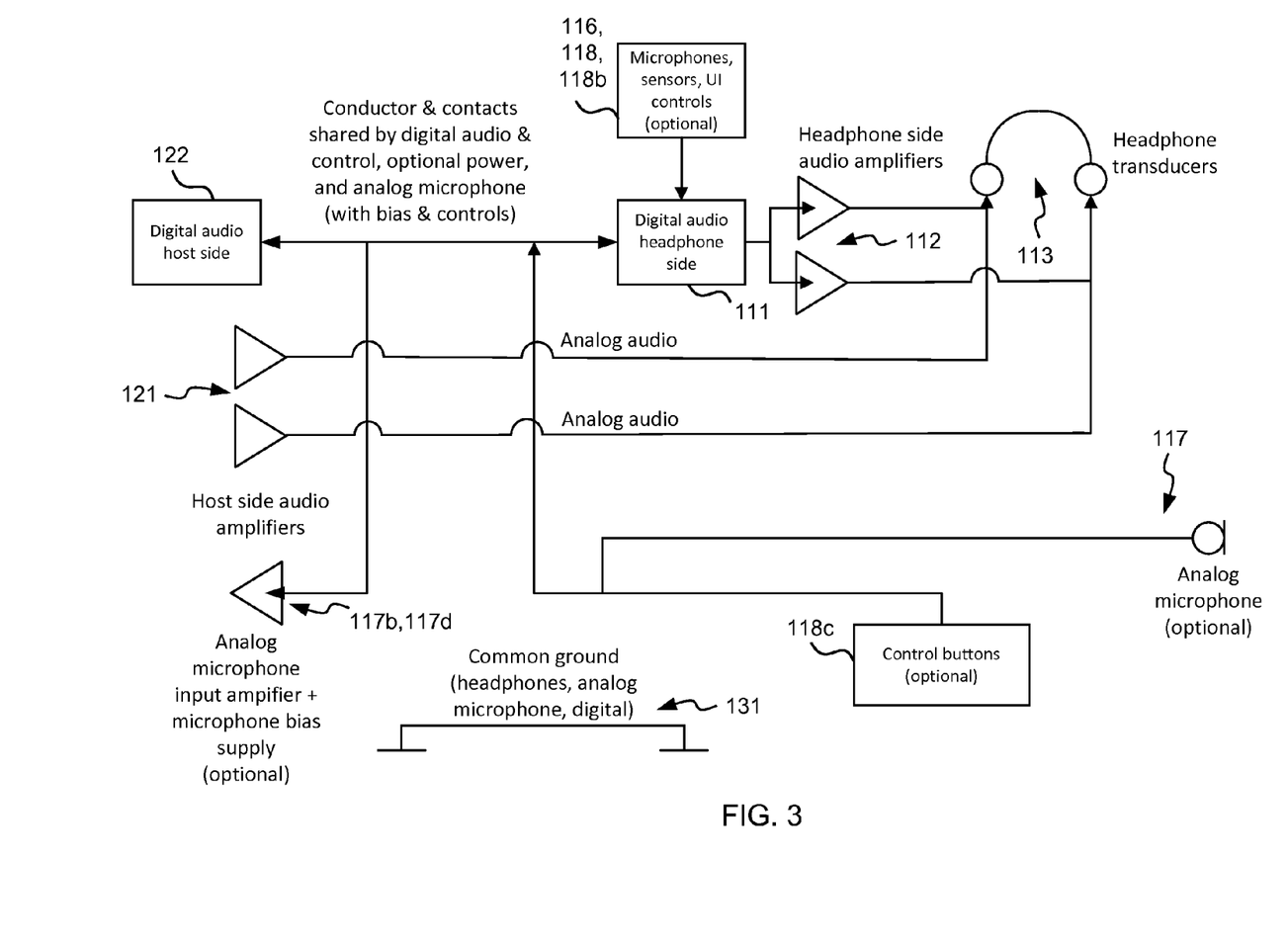
FIG. 3 is an example circuit diagram of a headphone apparatus and a host apparatus in accordance with an example embodiment.

FIG. 3 is an example circuit diagram of a headphone apparatus 110 and a host apparatus 120 in accordance with an example embodiment. The host apparatus 120 may be employed, for example, in the apparatus 800 of FIG. 8. However, it should be noted that the host apparatus 120 may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 3, the functionalities of the audio signal input interface 111, the headphone audio amplifiers 112, the headphone transducers 113, the digital microphone 116, the analog microphone 117, the control unit 118, the host audio amplifiers 121, and the audio signal output interface 122 are substantially similar to those of their counterparts in the example of FIG. 1, so their descriptions are not repeated here in detail. The example of FIG. 3 further comprises an analog microphone input amplifier 117b, a microphone bias supply 117d, sensors 118b, control buttons 118c, and ground 131.

In the example of FIG. 3, the same physical wires for analog microphone and digital communication are used so that if the digital interface is not detected then the host side functionality is analog. Digital communication and analog input share the same connector pins and cable conductors, but are not in use simultaneously.

Figure 4:
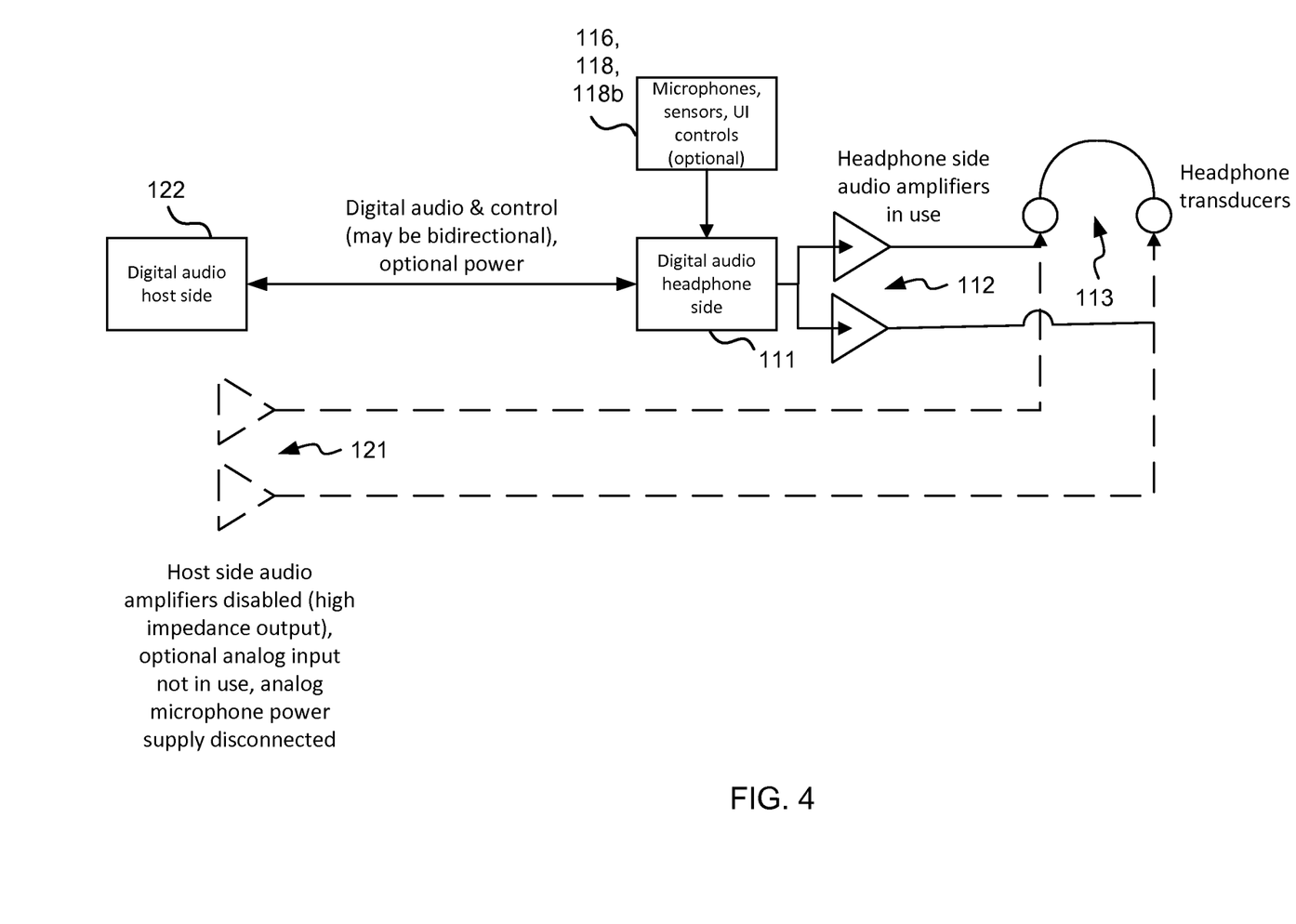
FIG. 4 is an example circuit diagram of a headphone apparatus and a host apparatus in accordance with an example embodiment.

FIG. 4 is an example circuit diagram of a headphone apparatus 110 and a digital audio output host apparatus in accordance with an example embodiment. The digital audio output host apparatus may be employed, for example, in the apparatus 800 of FIG. 8. However, it should be noted that the digital audio output host apparatus may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 4, the functionalities of the audio signal input interface 111, the headphone audio amplifiers 112, the headphone transducers 113, the digital microphone 116, the control unit 118, the host audio amplifiers 121 (disabled), and the audio signal output interface 122 are substantially similar to those of their counterparts in the example of FIG. 1, so their descriptions are not repeated here in detail. The example of FIG. 4 further comprises sensors 118b.

The example of FIG. 4 illustrates the functionality of the host apparatus 120 and the headphone apparatus 110 when the connected headphone apparatus 110 is compliant with the invention allowing digital and analog connectivity. Host side audio amplifiers 121 are disabled (high impedance output), optional analog input is not in use, and analog microphone power supply is disconnected.

Figure 5:
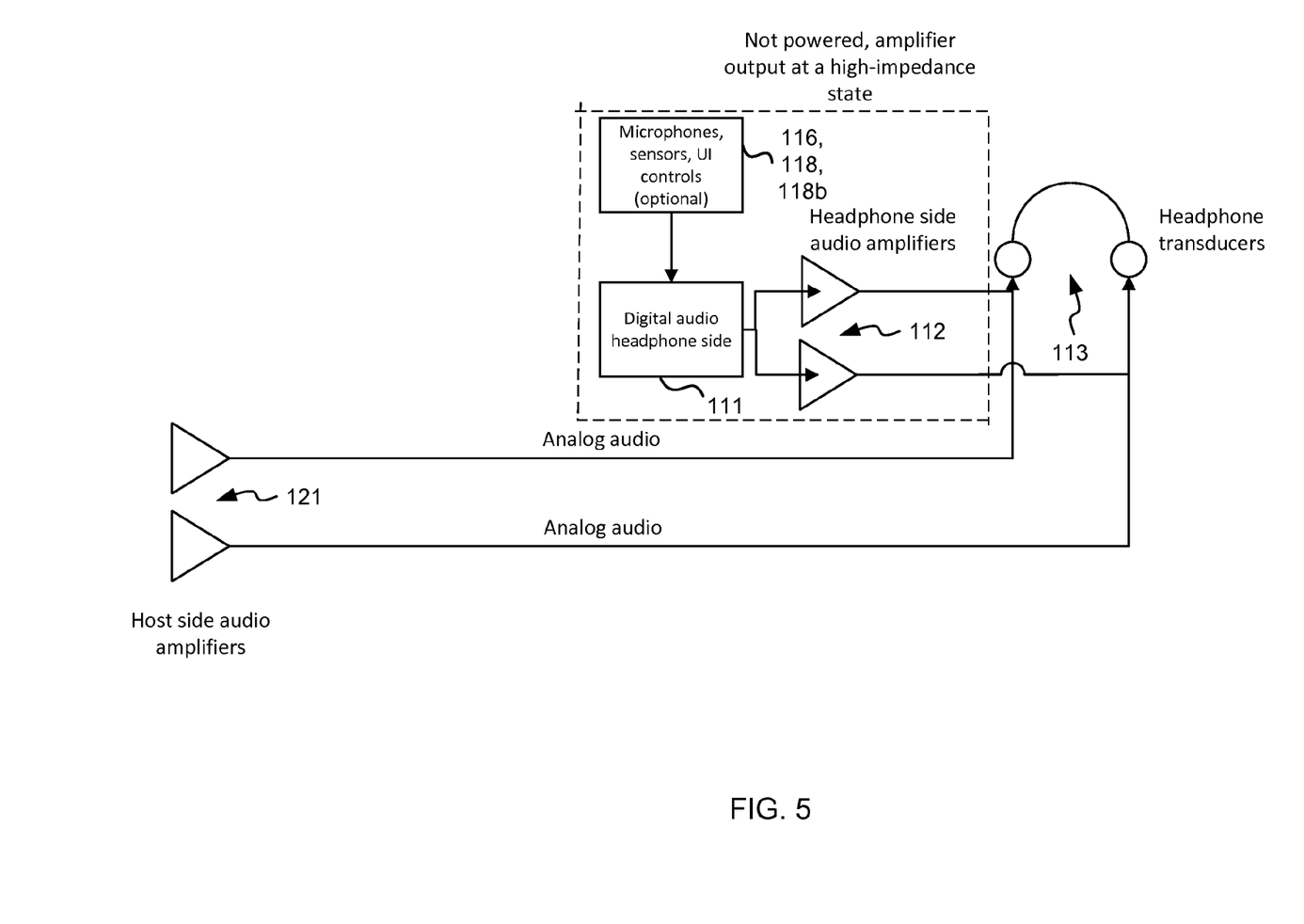
FIG. 5 is an example circuit diagram of a headphone apparatus and a host apparatus in accordance with an example embodiment.

FIG. 5 is an example circuit diagram of a headphone apparatus 110 and an analog audio output host apparatus in accordance with an example embodiment. The analog audio output host apparatus may be employed, for example, in the apparatus 800 of FIG. 8. However, it should be noted that the analog audio output host apparatus may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 5, the functionalities of the audio signal input interface 111, the headphone audio amplifiers 112 (disabled), the headphone transducers 113, the digital microphone 116, the control unit 118, and the host audio amplifiers 121 are substantially similar to those of their counterparts in the example of FIG. 1, so their descriptions are not repeated here in detail. The example of FIG. 5 further comprises sensors 118b.

The example of FIG. 5 illustrates the functionality of the headphone apparatus 110 according to the invention when connected to a conventional headphone output of a non-compliant source device. The headphone audio amplifiers 112 are disabled. An analog microphone (not shown in FIG. 5) may be implemented as an option.

Figure 6:
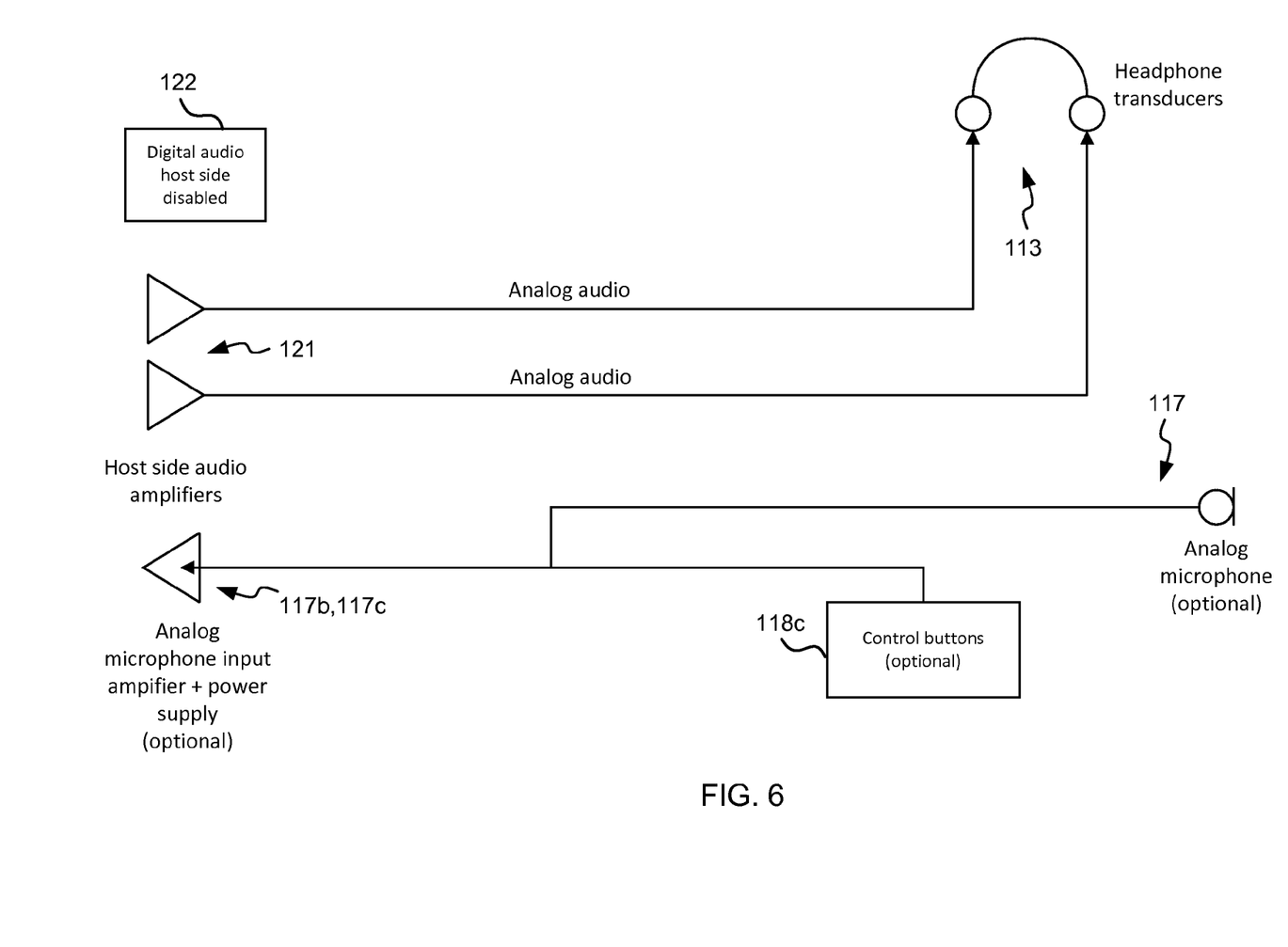
FIG. 6 is an example circuit diagram of a headphone apparatus and a host apparatus in accordance with an example embodiment.

FIG. 6 is an example circuit diagram of a conventional headphone apparatus and a host apparatus 120 of the invention in accordance with an example embodiment. The host apparatus 120 may be employed, for example, in the apparatus 800 of FIG. 8. However, it should be noted that the host apparatus 120 may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 6, the functionalities of the headphone transducers 113, the analog microphone 117, the host audio amplifiers 121, and the audio signal output interface 122 are substantially similar to those of their counterparts in the example of FIG. 1, so their descriptions are not repeated here in detail. The example of FIG. 6 further comprises an analog microphone input amplifier 117b, a microphone power supply 117c, and control buttons 118c.

The example of FIG. 6 illustrates the functionality of the host apparatus 120 according to the invention when a conventional (analog) headphone is connected to the output. The example of FIG. 6 may additionally/alternatively be used to provide low power consumption. In an example, the user interface 119 may include an option to enable/disable a low power consumption mode.

Figure 7:
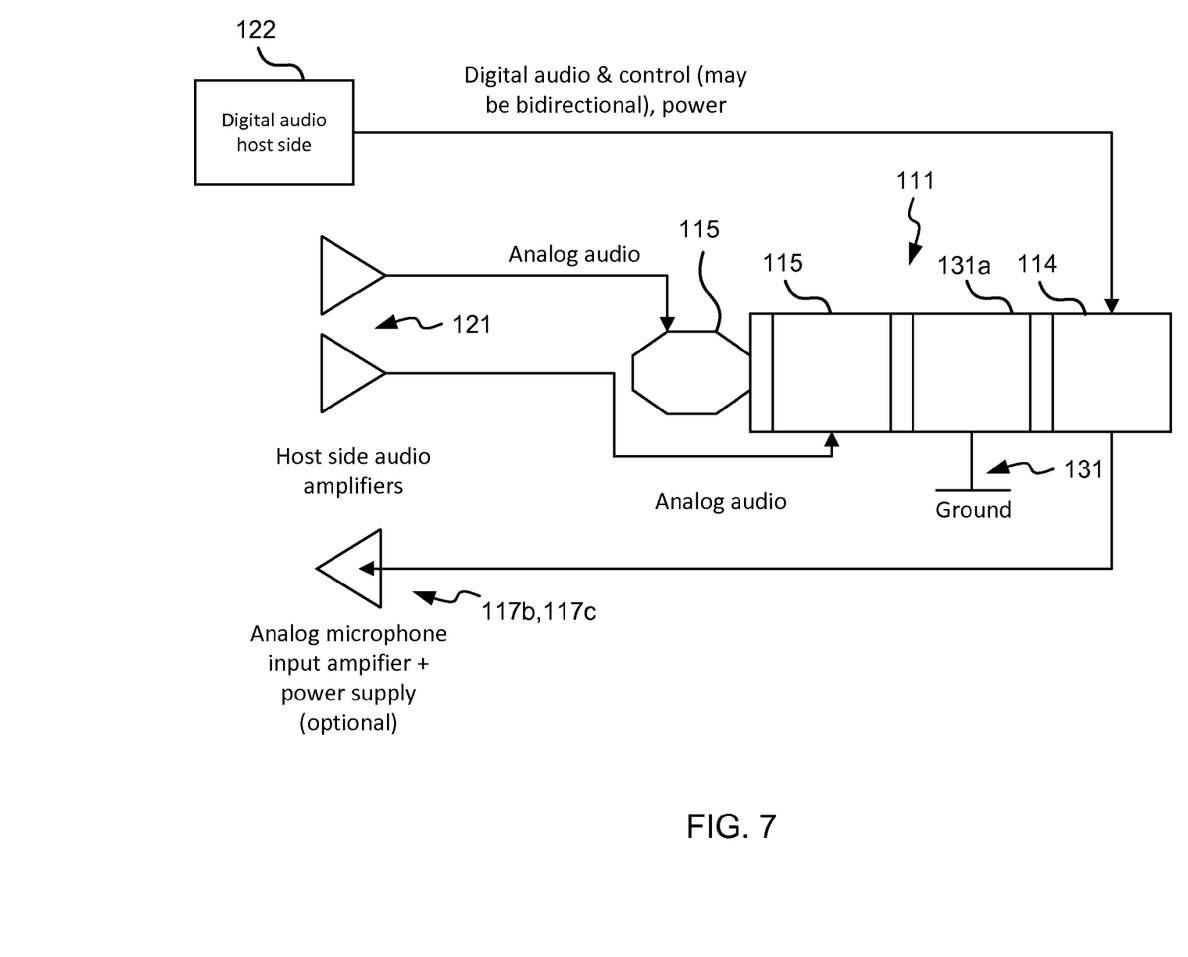
FIG. 7 is an example circuit diagram of a headphone apparatus and a host apparatus in accordance with an example embodiment.

FIG. 7 is an example circuit diagram of a headphone apparatus 110 and a host apparatus 120 in accordance with an example embodiment illustrating an example of use of a 3.5 mm plug. The host apparatus 120 may be employed, for example, in the apparatus 800 of FIG. 8. However, it should be noted that the host apparatus 120 may also be employed on a variety of other apparatuses, and therefore, embodiments should not be limited to application on apparatuses such as the apparatus 800 of FIG. 8. Furthermore, it should be noted that at least some of the elements described below may not be mandatory and thus some may be omitted in certain embodiments.

In the example of FIG. 7, the functionalities of the audio signal input interface 111, the host audio amplifiers 121, and the audio signal output interface 122 are substantially similar to those of their counterparts in the example of FIG. 1, so their descriptions are not repeated here in detail. The example of FIG. 7 further comprises an analog microphone input amplifier 117b, a microphone power supply 117c, a primary connector 114, a secondary connector 115, a ground connector 131a, and ground 131.

In the example of FIG. 7, digital communication and analog input share in this example the same connector pins and cable conductors, but are not in use simultaneously. The order of ground and digital/microphone contacts is here according to AHJ (American Headset Jack) specification, but may be reversed (OMTP, Open Mobile Terminal Platform), or detected automatically on the host side according to the actual layout used by the headphone apparatus.

Figure 8:
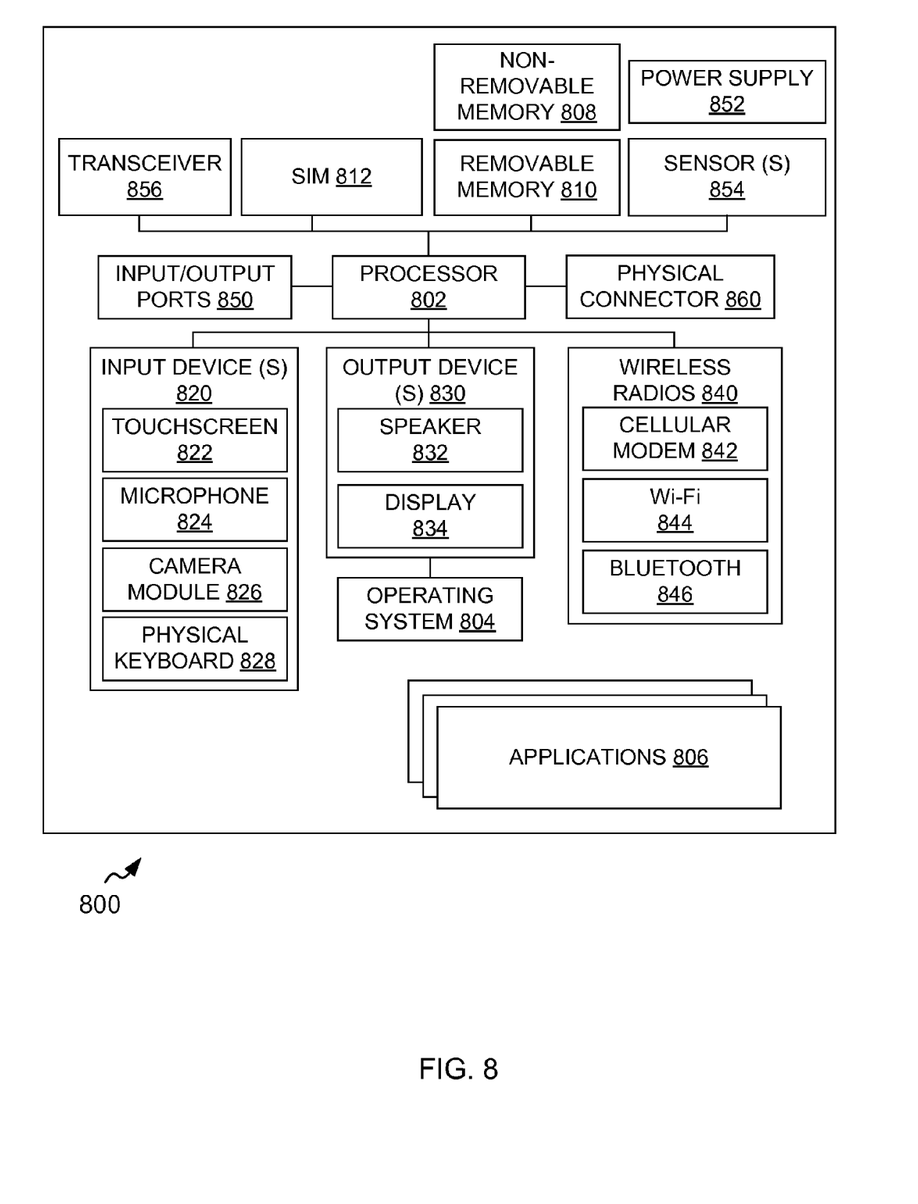
FIG. 8 illustrates an example block diagram of a mobile communication apparatus in accordance with an example embodiment.

FIG. 8 is a schematic block diagram of an apparatus 800 capable of implementing embodiments of the techniques described herein. It should be understood that the apparatus 800 as illustrated and hereinafter described is merely illustrative of one type of apparatus or an electronic device and should not be taken to limit the scope of the embodiments. As such, it should be appreciated that at least some of the components described below in connection with the apparatus 800 may be optional and thus in an example embodiment may include more, less or different components than those described in connection with the example embodiment of FIG. 8. As such, among other examples, the apparatus 800 could be any of wireless or mobile communication apparatuses, for example, mobile phones, smartphones, tablet computers, or any combination of the aforementioned, and other types of communication apparatuses, e.g. those incorporating audio source capabilities.

The illustrated apparatus 800 includes a controller or a processor 802 (i.e.—a signal processor, microprocessor, ASIC, or other control and processing logic circuitry) for performing such tasks as signal coding, data processing, input/output processing, power control, and/or other functions. An operating system 804 controls the allocation and usage of the components of the apparatus 800 and support for one or more application programs 806. The application programs 806 can include common mobile applications, for instance, telephony applications, email applications, calendars, contact managers, web browsers, messaging applications, or any other application.

The illustrated apparatus 800 includes one or more memory components, for example, a non-removable memory 808 and/or removable memory 810. The non-removable memory 808 can include RAM, ROM, flash memory, a hard disk, or other well-known memory storage technologies. The removable memory 810 can include flash memory or smart cards. The one or more memory components can be used for storing data and/or code for running the operating system 804 and the applications 806. Example of data can include web pages, text, images, sound files, image data, video data, or other data sets to be sent to and/or received from one or more network servers or other devices via one or more wired or wireless networks. The electronic device 800 may further include a subscriber identity module (SIM) 812. The SIM 812 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution).

The apparatus 800 can support one or more input devices 820 and one or more output devices 830. Examples of the input devices 820 may include, but are not limited to, a touchscreen 822 (i.e., capable of capturing finger tap inputs, finger gesture inputs, multi-finger tap inputs, multi-finger gesture inputs, or keystroke inputs from a virtual keyboard or keypad), a microphone 824 (i.e., capable of capturing voice input), a camera module 826 (i.e., capable of capturing still picture images and/or video images) and a physical keyboard 828. Examples of the output devices 830 may include, but are not limited to a speaker 832 and a display 834. Other possible output devices (not shown) can include piezoelectric or other haptic output devices. Some devices can serve more than one input/output function. For example, the touchscreen 822 and the display 834 can be combined into a single input/output device.

In an embodiment, the apparatus 800 may comprise a wireless radio(s) 840. The wireless radio(s) 840 8 can support two-way communications between the processor 802 and external devices, as is well understood in the art. The wireless radio(s) 840 are shown generically and can include, for example, a cellular modem 842 for communicating at long range with the mobile communication network, a Wi-Fi radio 844 for communicating at short range with a local wireless data network or router, and/or a Bluetooth radio 846. The cellular modem 842 is typically configured for communication with one or more cellular networks, such as a GSM/3G network for data and voice communications within a single cellular network, between cellular networks, or between the mobile device and a public switched telephone network (PSTN).

The apparatus 800 can further include one or more input/output ports 850, a power supply 852, one or more sensors 854 for example, an accelerometer, a gyroscope, a compass, or an infrared proximity sensor for detecting the orientation or motion of the electronic device 800, a transceiver 856 (for wirelessly transmitting analog or digital signals) and/or a physical connector 860, which can be e.g. a USB port, IEEE 1394 (FireWire) port, and/or RS-232 port. The illustrated components are not required or all-inclusive, as any of the components shown can be deleted and other components can be added.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing based devices it will be appreciated that the storage may be distributed or located remotely and accessed via a network or other communication link, for example by using a communication interface.

At least some of the examples disclosed in FIGS. 1-8 are able to provide a headphone apparatus and an associated host (i.e. audio source) apparatus that support both digital and analog audio connectivity. When both the headphone apparatus and the host apparatus conform to the described interfaces, the arrangement provides digital connectivity for audio and optionally for control data, but the headphone apparatus can be also connected to any conventional analog headphone output, and the host apparatus can be used with any conventional analog headphone.

At least some of the examples disclosed in FIGS. 1-8 are able to provide use of proprietary signal processing in the headphone side, easier implementation of active noise cancellation, use of local sensor information, audio processing including device specific equalization, and the like.

At least some of the examples disclosed in FIGS. 1-8 are able to provide a low power consumption mode.

An embodiment of a headphone apparatus comprises an audio signal input interface configured to receive an input audio signal from a connected host apparatus; at least one headphone audio amplifier configured to be disabled in response to the input audio signal being analog, and further configured to amplify the input audio signal in response to the input audio signal being digital; and at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

In an embodiment, alternatively or in addition to the above described embodiments, the at least one headphone audio amplifier is configured to be disabled by being switched to a high output impedance state.

In an embodiment, alternatively or in addition to the above described embodiments, the audio signal input interface comprises at least one primary connector configured to receive a digital input audio signal from the connected host apparatus, and at least one secondary connector configured to receive an analog input audio signal from the connected host apparatus.

In an embodiment, alternatively or in addition to the above described embodiments, the at least one primary connector is further configured to provide the received digital input audio signal to the at least one headphone audio amplifier, and the at least one secondary connector is further configured to provide the received analog input audio signal to the at least one headphone transducer.

In an embodiment, alternatively or in addition to the above described embodiments, the headphone apparatus further comprises a digital microphone configured to provide a digital microphone signal.

In an embodiment, alternatively or in addition to the above described embodiments, the headphone apparatus further comprises an analog microphone configured to provide an analog microphone signal.

In an embodiment, alternatively or in addition to the above described embodiments, the headphone apparatus further comprises a control unit configured to control at least one of the headphone apparatus and the connected host apparatus in accordance with received control data.

In an embodiment, alternatively or in addition to the above described embodiments, the control data is received from a user interface comprised in at least one of the headphone apparatus and the connected host apparatus.

In an embodiment, alternatively or in addition to the above described embodiments, the headphone apparatus is configured to apply auxiliary signal processing to a digital input audio signal.

In an embodiment, alternatively or in addition to the above described embodiments, the auxiliary signal processing comprises at least one of active noise cancellation, utilization of sensor data from at least one sensor comprised in the headphone apparatus, and equalization specific to the headphone apparatus.

In an embodiment, alternatively or in addition to the above described embodiments, the audio signal input interface comprises a 3.5 mm plug.

In an embodiment, alternatively or in addition to the above described embodiments, the audio signal input interface conforms to a mobile industry processor interface.

An embodiment of a host apparatus comprises at least one host audio amplifier configured to be disabled in response to a connected headphone apparatus supporting digital audio communication, and further configured to amplify the output audio signal in response to the connected headphone apparatus not supporting digital audio communication; and an audio signal output interface configured to output a non-amplified output audio signal in digital form in response to the connected headphone apparatus supporting digital audio communication, and to output the amplified output audio signal in analog form in response to the connected headphone apparatus not supporting digital audio communication.

In an embodiment, alternatively or in addition to the above described embodiments, the at least one host audio amplifier is configured to be disabled by being switched to a high output impedance state.

In an embodiment, alternatively or in addition to the above described embodiments, the host apparatus is configured to detect whether the connected headphone apparatus supports digital audio communication.

In an embodiment, alternatively or in addition to the above described embodiments, the host apparatus is configured to perform the detection of whether the connected headphone apparatus supports digital audio communication by detecting connector order of an audio signal input interface of the connected headphone apparatus.

In an embodiment, alternatively or in addition to the above described embodiments, the audio signal output interface comprises a 3.5 mm socket.

In an embodiment, alternatively or in addition to the above described embodiments, the audio signal output interface conforms to a mobile industry processor interface.

In an embodiment, alternatively or in addition to the above described embodiments, the host apparatus comprises a mobile communication apparatus.

An embodiment of a system comprises a host apparatus and a headphone apparatus. The host apparatus comprises at least one host audio amplifier configured to be disabled in response to a connected headphone apparatus supporting digital audio communication, and further configured to amplify an output audio signal in response to the connected headphone apparatus not supporting digital audio communication; and an audio signal output interface configured to output a non-amplified output audio signal in digital form in response to the connected headphone apparatus supporting digital audio communication, and to output the amplified output audio signal in analog form in response to the connected headphone apparatus not supporting digital audio communication. The headphone apparatus comprises an audio signal input interface configured to receive an input audio signal from a connected host apparatus; at least one headphone audio amplifier configured to be disabled in response to the input audio signal being analog, and further configured to amplify the input audio signal in response to the input audio signal being digital; and at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and an apparatus or a system may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An apparatus, comprising:
   an audio signal input interface, within a headphone, configured to receive an input audio signal from a connected host apparatus and detect whether the received input audio signal from the connected host apparatus is analog or digital;
   at least one headphone audio amplifier, within the headphone, configured to be disabled in response to the input audio signal being analog, and further configured to amplify the input audio signal in response to the input audio signal being digital; and
   at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

2. The apparatus as claimed in claim 1, wherein the at least one headphone audio amplifier is configured to be disabled by being switched to a high output impedance state.

3. The apparatus as claimed in claim 1, wherein the audio signal input interface comprises at least one primary connector configured to receive a digital input audio signal from the connected host apparatus, and at least one secondary connector configured to receive an analog input audio signal from the connected host apparatus.

4. The apparatus as claimed in claim 3, wherein the at least one primary connector is further configured to provide the received digital input audio signal to the at least one headphone audio amplifier based on detection of the audio signal being analog, and the at least one secondary connector is further configured to provide the received analog input audio signal to the at least one headphone transducer.

5. The apparatus as claimed in claim 1, further comprising a digital microphone configured to provide a digital microphone signal.

6. The apparatus as claimed in claim 1, further comprising an analog microphone configured to provide an analog microphone signal.

7. The apparatus as claimed in claim 1, further comprising a control unit configured to control at least one of the headphone apparatus and the connected host apparatus in accordance with received control data.

8. The apparatus as claimed in claim 7, wherein the control data is received from a user interface comprised in at least one of the headphone apparatus and the connected host apparatus.

9. The apparatus as claimed in claim 1, wherein the headphone apparatus is configured to apply auxiliary signal processing to a digital input audio signal.

10. The apparatus as claimed in claim 9, wherein the auxiliary signal processing comprises at least one of active noise cancellation, utilization of sensor data from at least one sensor comprised in the headphone apparatus, and equalization specific to the headphone apparatus.

11. The apparatus as claimed in claim 1, wherein the audio signal input interface comprises a 3.5 mm plug.

12. The apparatus as claimed in claim 1, wherein the audio signal input interface conforms to a mobile industry processor interface.

13. A host apparatus, comprising:
   at least one host audio amplifier configured to be disabled in response to a connected headphone apparatus supporting digital audio communication, and further configured to amplify the output audio signal in response to the connected headphone apparatus not supporting digital audio communication, wherein the amplified output audio signal is configured to disable an amplifier in the headphone apparatus based on being an analog signal; and
   an audio signal output interface configured to output a non-amplified output audio signal in digital form in response to the connected headphone apparatus supporting digital audio communication, and to output the amplified output audio signal in analog form in response to the connected headphone apparatus not supporting digital audio communication.

14. The host apparatus as claimed in claim 13, wherein the at least one host audio amplifier is configured to be disabled by being switched to a high output impedance state.

15. The host apparatus as claimed in claim 13, wherein the host apparatus is configured to detect whether the connected headphone apparatus supports digital audio communication.

16. The host apparatus as claimed in claim 15, wherein the host apparatus is configured to perform the detection of whether the connected headphone apparatus supports digital audio communication by detecting connector order of an audio signal input interface of the connected headphone apparatus.

17. The host apparatus as claimed in claim 13, wherein the audio signal output interface comprises a 3.5 mm socket.

18. The host apparatus as claimed in claim 13, wherein the audio signal output interface conforms to a mobile industry processor interface.

19. The host apparatus as claimed in claim 13, wherein the host apparatus comprises a mobile communication apparatus.

20. A system, comprising:
  a host apparatus, comprising:
    at least one host audio amplifier configured to be disabled in response to a connected headphone apparatus supporting digital audio communication, and further configured to amplify an output audio signal in response to the connected headphone apparatus not supporting digital audio communication; and
    an audio signal output interface configured to output a non-amplified output audio signal in digital form in response to the connected headphone apparatus supporting digital audio communication, and to output the amplified output audio signal in analog form in response to the connected headphone apparatus not supporting digital audio communication, and
  a headphone apparatus, comprising:
    an audio signal input interface configured to receive an input audio signal from the host apparatus and detect whether the received input audio signal from the connected host apparatus is an analog or digital signal;
    at least one headphone audio amplifier configured to be disabled in response to the input audio signal being analog, and further configured to amplify the input audio signal in response to the input audio signal being digital; and
    at least one headphone transducer configured to obtain the input audio signal from the audio signal input interface in response to the input audio signal being analog, to obtain the amplified input audio signal from the at least one headphone audio amplifier in response to the input audio signal being digital, and to output the obtained audio signal.

\* \* \* \* \*